(12) United States Patent
Kato et al.

(10) Patent No.: US 7,400,116 B2
(45) Date of Patent: Jul. 15, 2008

(54) PRE-CHARGING SYSTEM FOR SMOOTHING CAPACITOR

(75) Inventors: Takeshi Kato, Wako (JP); Yoshiki Tatsutomi, Wako (JP); Mitsuaki Hirakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 157 days.

(21) Appl. No.: 11/084,736

(22) Filed: Mar. 21, 2005

(65) Prior Publication Data
US 2005/0231172 A1  Oct. 20, 2005

(30) Foreign Application Priority Data
Mar. 29, 2004  (JP) .............................. 2004-095212

(51) Int. Cl.
*H02J 7/00* (2006.01)
(52) U.S. Cl. ....................................................... 320/166
(58) Field of Classification Search ................ 320/166, 320/167, 145, 128, 109, 106, 51, 116
See application file for complete search history.

(56) References Cited

U.S. PATENT DOCUMENTS

| | | | | |
|---|---|---|---|---|
| RE27,040 E | * | 1/1971 | Risberg | 318/798 |
| 5,369,540 A | * | 11/1994 | Konrad et al. | 361/6 |
| 5,804,973 A | * | 9/1998 | Shinohara et al. | 324/548 |
| 6,154,379 A | * | 11/2000 | Okita | 363/40 |
| 6,157,165 A | * | 12/2000 | Kinoshita et al. | 320/116 |
| 6,377,482 B1 | * | 4/2002 | Kolar et al. | 363/84 |
| 6,377,880 B1 | * | 4/2002 | Kato et al. | 701/29 |
| 6,462,507 B2 | * | 10/2002 | Fisher, Jr. | 320/101 |
| 6,597,072 B2 | * | 7/2003 | Yamazaki | 307/9.1 |
| 6,909,263 B2 | * | 6/2005 | Xu et al. | 322/29 |

FOREIGN PATENT DOCUMENTS

JP     2002-247711     8/2002

* cited by examiner

*Primary Examiner*—Adolf Berhane
*Assistant Examiner*—M'Baye Diao
(74) *Attorney, Agent, or Firm*—Squire, Sanders & Dempsey

(57) ABSTRACT

When a control means turns on a pre-charging contactor, an AC current from an AC power source is converted into a DC current by a switching circuit to charge a smoothing capacitor. However, the smoothing capacitor cannot be charged completely due to the operation of a capacitor of an LC filter. Therefore, when the voltage of the smoothing capacitor detected by a voltage detecting means exceeds a predetermined value, the smoothing capacitor is further charged by bringing the switching circuit into a boosting operation. Thus, even if an LC relay required in the prior art for invalidating the capacitor of the LC filter is not provided, it is possible to completely charge the smoothing capacitor, thereby providing a decrease in the number of parts and an enhancement in reliability of the pre-charging circuit, and preventing a reduction in performance of the LC filter due to a loss in the LC relay.

6 Claims, 5 Drawing Sheets

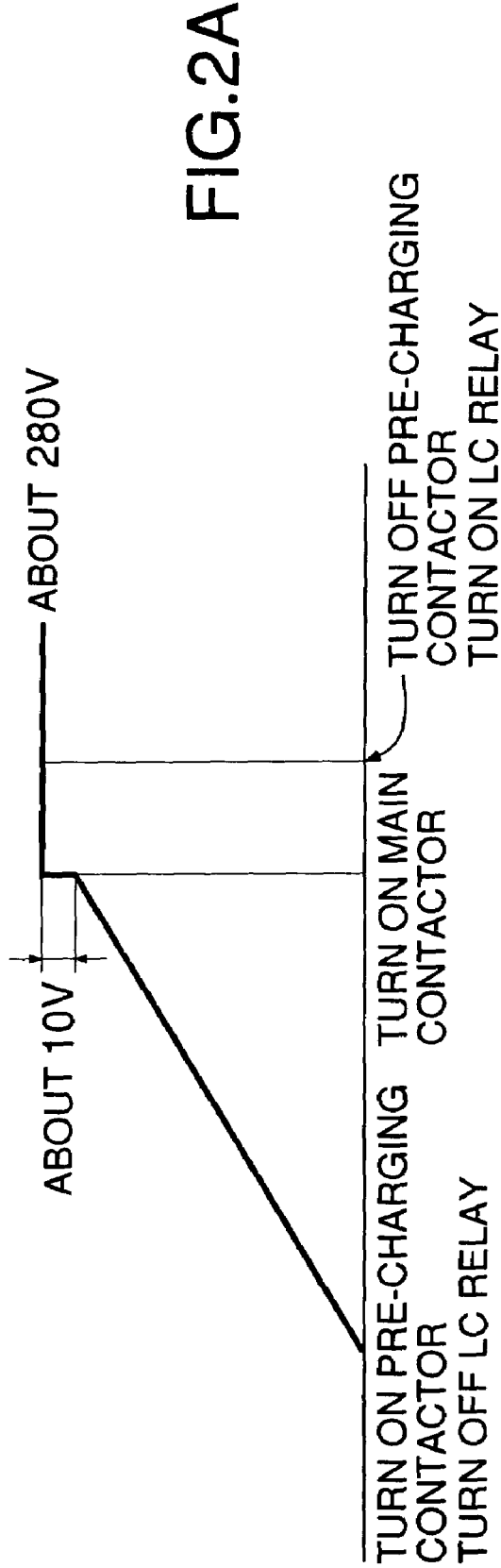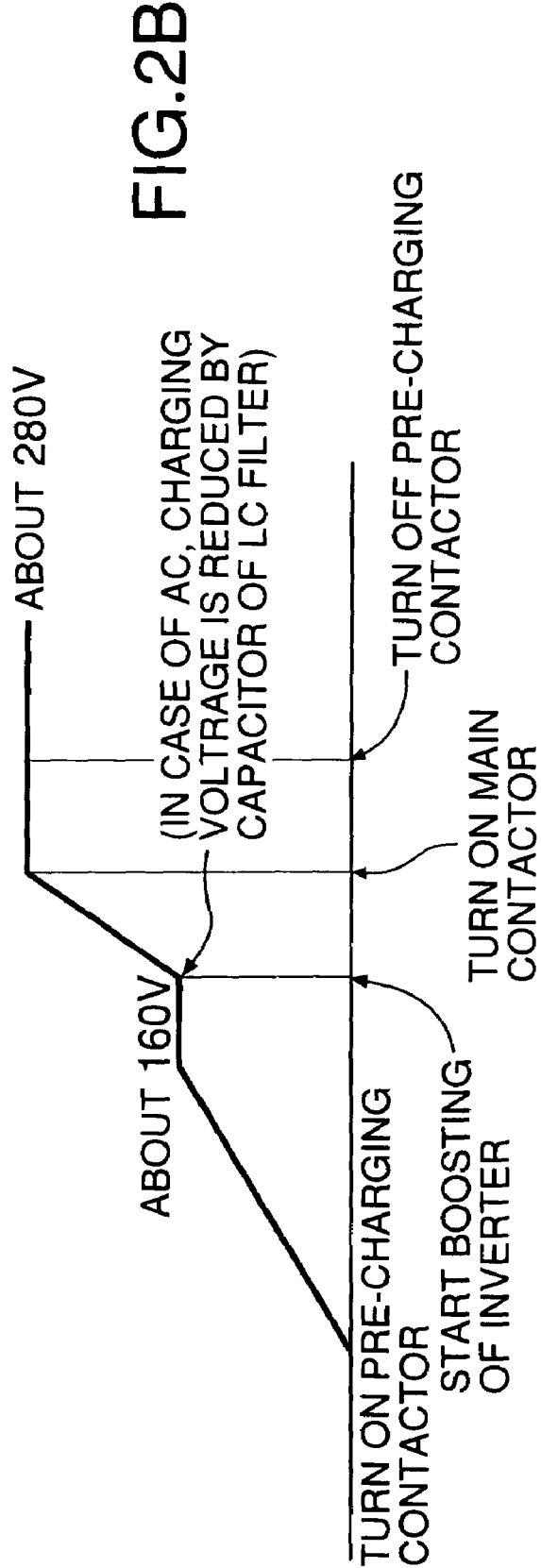

PRE-CHARGING SYSTEM FOR SMOOTHING CAPACITOR

RELATED APPLICATION DATA

The Japanese priority application No. 2004-95212 upon which the present application is based is hereby incorporated in its entirety herein by reference.

BACKGROUND OF THE INVENTION

1. Field of the Invention

The present invention relates to a pre-charging system for charging a smoothing capacitor connected in parallel to a switching circuit.

2. Description of the Related Art

Japanese Patent Application Laid-open No. 2002-247711 discloses a hybrid vehicle provided with an engine and a motor/generator as traveling drive sources. In this hybrid vehicle, when charging a smoothing capacitor connected to an inverter for converting a DC current of a main battery into an AC current, the motor/generator is driven by the engine to generate an AC current, which is then converted into a DC current by causing the inverter to function as a converter, thereby charging the smoothing capacitor.

When an AC current is converted into a DC current by a converter, and thereafter the DC current is converted into an AC current having a frequency different from that of the original AC current by the inverter, an LC filter comprising a combination of a coil and a capacitor is mounted in order to dull a rectangular wave generated by turning on and off a switching element of an inverter to form a sine wave. However, when the smoothing capacitor is charged, an electric current flows also to the capacitor of the LC filter, and hence there is a problem that the smoothing capacitor cannot be sufficiently charged. Therefore, in the prior art, the complete charging of the smoothing capacitor can be achieved by charging the smoothing capacitor in a state in which the capacitor of the LC filter has been disconnected by an LC relay.

However, if the LC relay is provided on the LC filter in order to completely charge the smoothing capacitor, there is a problem that not only the number of parts is increased, but also the reliability of a pre-charging circuit for charging the smoothing capacitor is reduced, and the performance of the LC filter is reduced due to a loss in the LC relay.

SUMMARY OF THE INVENTION

Accordingly, it is an object of the present invention to completely charge a smoothing capacitor connected to a switching circuit without need for an LC relay.

In order to achieve the above-mentioned object, according to the present invention, there is provided a pre-charging system for a smoothing capacitor, comprising: an AC power source; a switching circuit connected to the AC power source; a smoothing capacitor connected in parallel to the switching circuit; a main contactor disposed between the AC power source and the switching circuit; an LC filter disposed between the main contactor and the switching circuit; a pre-charging contactor connected in parallel to the main contactor; a voltage detecting means for detecting a voltage of the smoothing capacitor; and a control means for controlling charging of the smoothing capacitor, wherein the control means turns on the pre-charging contactor to charge the smoothing capacitor through the switching circuit by the AC power source; and brings the switching circuit into a boosting operation to further charge the smoothing capacitor, when the voltage of the smoothing capacitor detected by the voltage detecting means exceeds a predetermined value.

An inverter 14 in an embodiment corresponds to the switching circuit of the present invention.

With the arrangement of the first feature, when the control means turns on the pre-charging contactor, an AC current from the AC power source is converted into a DC current by the switching circuit to charge the smoothing capacitor. However, the smoothing capacitor cannot be charged completely due to the operation of the capacitor of the LC filter. Therefore, when the voltage of the smoothing capacitor detected by the voltage detecting means exceeds the predetermined value, the smoothing capacitor is further charged by bringing the switching circuit into a boosting operation. Thus, even if an LC relay required in the prior art for invalidating the capacitor of the LC filter is not provided, it is possible to completely charge the smoothing capacitor, thereby providing a decrease in the number of parts and an enhancement in reliability of the pre-charging circuit, and preventing a reduction in performance of the LC filter due to a loss in an LC relay.

The above and other objects, features and advantages of the invention will become apparent from the following description of the preferred embodiment taken in conjunction with the accompanying drawings.

BRIEF DESCRIPTION OF THE DRAWINGS

FIGS. 2A and 2B are diagrams for explaining the operation during charging of a smoothing capacitor in the pre-charging system.

DETAILED DESCRIPTION OF PREFERRED EMBODIMENT

The present invention will now be described by way of an embodiment with reference to the accompanying drawings.

Figure 1:
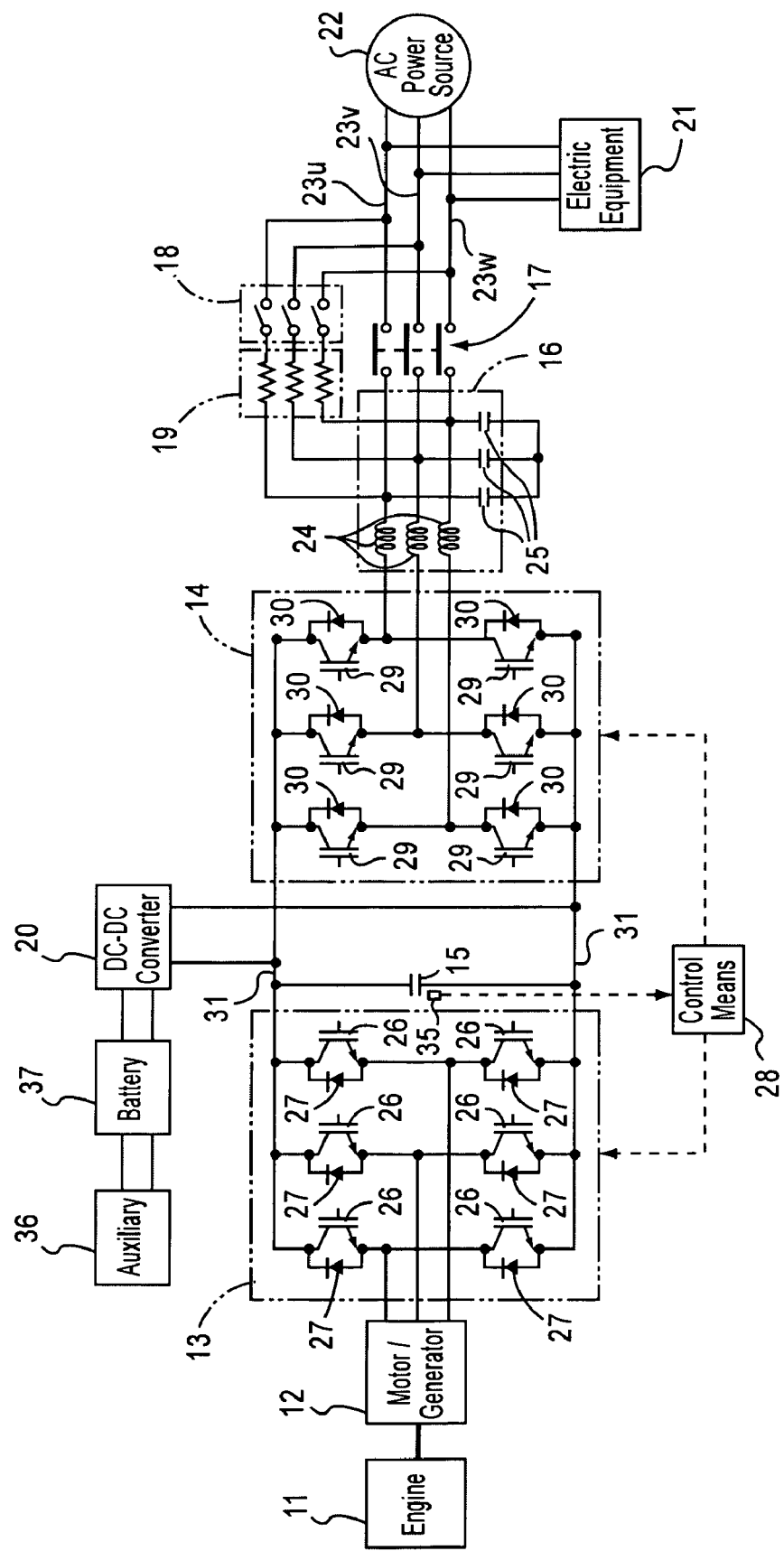
FIG. 1 is a circuit diagram of a power generating system in a pre-charging system according to the present invention.

As shown in FIG. 1, a power generating system using a stationary gas turbine engine 11 as a power source, comprises a motor/generator 12, a converter 13, an inverter 14, a smoothing capacitor 15, an LC filter 16, a main contactor 17, a pre-charging contactor 18, a pre-charging resistor 19 and a DC-DC converter 20.

The motor/generator 12 functions as a generator to generate a three-phase AC current, when it is driven by the gas turbine engine 11; and is used as a stator motor for starting the gas turbine engine 11, when it receives supply of a three-phase AC current to function as a motor. An AC current of a high frequency generated by the motor/generator 12 is converted into a DC current in the converter 13, and then converted into a three-phase AC current of a predetermined frequency in the inverter 14, namely, a three-phase AC current of the same frequency as that of an AC power source 22 of 200 V which is a commercial power source. The obtained current is used as a power source for a desired electric equipment, or sold to the owner of the AC power source 22. The DC current resulting from the conversion in the converter 13 is reduced to a predetermined voltage in the DC-DC converter 20 and supplied to charge an auxiliary battery 37 for driving an auxiliary 36 for the motor/generator 12. To start the motor/generator 12, the inverter 14 is caused to function as a converter to convert the three-phase AC current of the AC power source 22 into a DC current, and thereafter the converter 13 is caused to function as an inverter to convert the DC current into a three-phase AC current, thereby driving the motor/generator 12 as a starter motor.

A main contactor 17 is disposed between the AC power source 22 and the inverter 14. The main contactor 17 is turned on when the motor/generator 12 is caused to function as the starter motor by the three-phase AC current of the AC power source 22 to start the gas turbine engine 11, when the electric equipment 21 is driven by the three-phase AC current generated by the motor/generator 12, and when the three-phase AC current generated by the motor/generator 12 is sold to the owner of the AC power source 22. The LC filter 16 for converting a rectangular wave-shaped three-phase AC current output by the inverter 14 into a sine wave-shaped three-phase AC current is disposed between the main contactor 17 and the inverter 14. The LC filter 16 comprises: three coils 24 disposed respectively between U-phase, V-phase and W-phase lines 23$u$, 23$v$ and 23$w$ leading to the AC power source 22; and three capacitors 25 disposed respectively between the U-phase, V-phase and W-phase lines 23$u$, 23$v$ and 23$w$.

The converter 13 comprises: six switching elements 26 each including, for example, a field effect transistor; and diodes 27 each connecting a collector and an emitter of each of the switching elements 26. A base of each of the switching elements 26 is connected to a control means 28 and Pulse Width Modulation (PWM)-controlled by the control means 28. The inverter 14 has the same structure as that of the converter 13, and comprises, for example, six switching elements 29 each including a field effect transistor; and diodes 30 connecting a collector and an emitter of each of the switching elements 29. A base of each of the switching elements 29 is connected to the control means 28 and PWM-controlled by the control means 28.

The smoothing capacitor 15 having a large capacity is connected to DC lines 31, 31 connecting the converter 13 and the inverter 14 to each other, and exhibits a function for suppressing a fluctuation in DC current when the switching elements 26 of the converter 13 or the switching elements 29 of the inverter 14 are turned on or off. The pre-charging contactor 18 is disposed in parallel to the main contactor 17, and the pre-charging resistor 19 is disposed in series with the pre-charging contactor 18.

The operation of the embodiment having the above-described arrangement will be described below.

When the power generating system is not operative, the smoothing capacitor 15 is in a discharged state. Before starting the operation of the power generating system, the smoothing capacitor 15 is charged (pre-charged) to have a predetermined voltage (280 V in the embodiment). When an attempt is made to directly charge the smoothing capacitor 15 from the AC power source by turning on the main contactor 17, there is a possibility that a large electric current equal to or larger than a acceptable value may flow to the main contactor 17. Therefore, by charging the smoothing capacitor 15 with a voltage reduced by turning on the pre-charging contactor 18 to which the pre-charging resistor 19 is connected in series, the large electric current equal to or larger than the acceptable value can be prevented from flowing to the main contactor 17.

Figure 5:
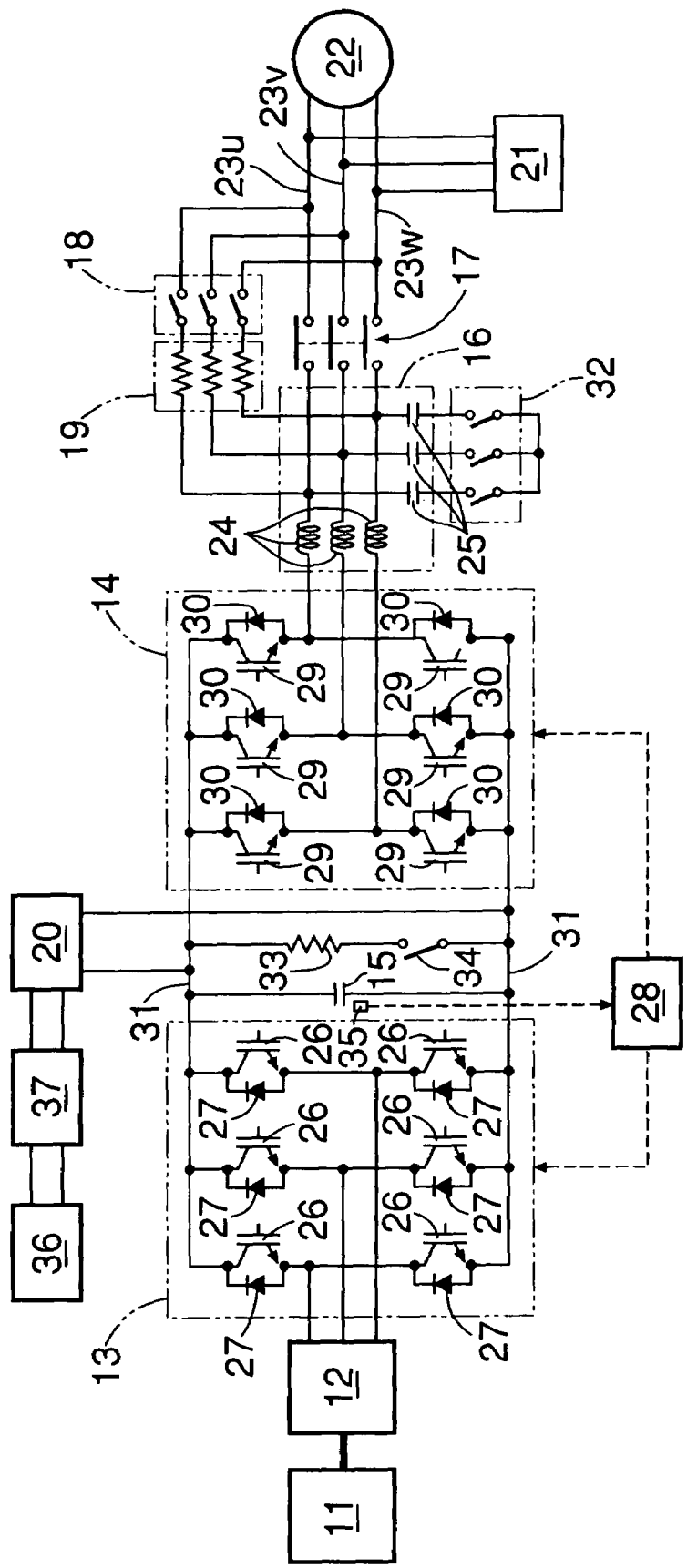
FIG. 5 is a circuit diagram of a conventional power generating system.

However, when the smoothing capacitor 15 is charged, the electric current flows also to the capacitors 25 of the LC filter 16. Therefore, the smoothing capacitor 15 cannot be fully charged up to 280 V, resulting in charging up to about 160 V at most. Therefore, in a conventional power generating system shown in FIG. 5, pre-charging contactors 18 are turned on to conduct the charging in a state in which capacitors 25 of an LC filter 16 are disconnected by an LC relay 32. If the charging is carried out in this manner, the smoothing capacitor 15 can be charged up to about 270 V, as shown in FIG. 2A, and if the main contactor 17 is then turned on, the smoothing capacitor 15 can be charged fully up to 280 V.

In the above-described conventional technique, however, there is a problem that not only the number of parts is increased by the LC relay 32, but also a reduction in reliability of a pre-charging circuit and a reduction in performance of the LC filter 16 due to a loss in the LC relay 32 are generated.

In the present embodiment, the LC relay 32 (see FIG. 5) provided in the prior art is not provided. Therefore, when the pre-charging contactor 18 is turned on, the smoothing capacitor 15 can be charged only up to about 160 V under the influence of the capacitors 25 of the LC filter 16, as shown in FIG. 2B. However, when the voltage of the smoothing capacitor 15 detected by a voltage detecting means 35 reaches a predetermined voltage (for example, 160 V), a command from the control means 28 drives the switching elements 29 of the inverter 14 to exhibit a boosting function, so that the smoothing capacitor 15 can be charged up to 280 V which is a standard voltage. When the smoothing capacitor 15 has been charged up to 280 V, the inverter 14 and the converter 13 are brought into their operable states by turning on the main contactor 17 and turning off the pre-charging contactor 18.

As described above, the smoothing capacitor 15 is charged utilizing the boosting function of the inverter 14, and hence even if the LC relay 32 is not provided and the pre-charging contactor 18 is turned on with the capacitors of the LC filter 16 remaining connected, the smoothing capacitor 15 can be charged without hindrance.

If the smoothing capacitor 15 is left charged when the operation of the power generating system is stopped, there is a possibility that this may cause an electric shock and the like during maintenance, and hence it is necessary to discharge the smoothing capacitor 15. Therefore, in the conventional power generating system shown in FIG. 5, a discharging resistor 33 and a discharging relay 34 are connected in parallel to the smoothing capacitor 15, and the discharging relay 34 is turned on to consume an electric charge in the discharging resistor 33, thereby discharging the smoothing capacitor 15; or the discharging resistor 33 is always connected to the smoothing capacitor 15 without disposing the discharging relay 34, thereby discharging the smoothing capacitor 15.

Figure 3A:
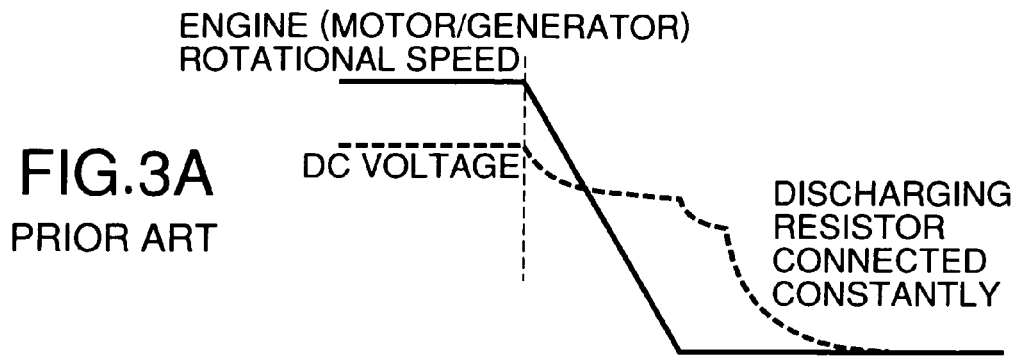
FIGS. 3A to 3D are diagrams for explaining the operation during discharging of the smoothing capacitor.

When the discharging is carried out by the discharging resistor 33 during stoppage of the power generating system in a state in which the discharging resistor 33 is constantly connected to the smoothing capacitor 15, as in a conventional example shown in FIG. 3A, the following situation is provided: when the gas turbine engine 11 is being rotated at a predetermined rotational speed, and the motor/generator is conducting a usual power generation, the voltage of the DC lines 31, 31 (namely, the voltage of the smoothing capacitor 15) is maintained at 280 V which is the standard voltage, but when the rotational speed of the gas turbine engine 11 starts to decrease, the electric charge of the smoothing capacitor 15 is consumed by the discharging resistor 33, so that the voltage of the smoothing capacitor 15 is reduced to zero after stoppage of the gas turbine engine 11.

However, if the discharging resistor 33 is constantly connected to the smoothing capacitor 15 to conduct the discharging, there is a problem that the number of parts is increased by the discharging resistor 33, and the electric current flows to the discharging resistor 33 also during operation of the power generating system, so that the electric power is wastefully consumed.

Figure 3B:
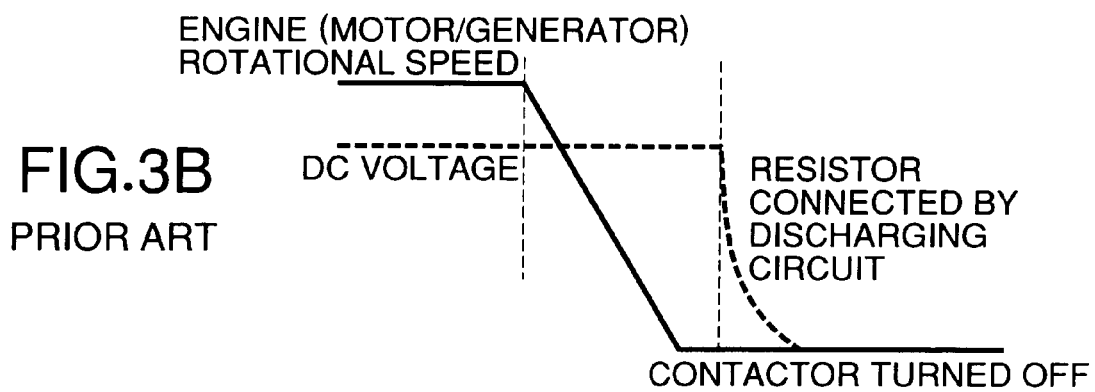

If the discharging resistor 33 is connected through the discharging relay 34 to the smoothing capacitor 15, and the discharging relay 34 is turned on during stoppage of the power generating system to conduct the discharging by the discharging resistor 33, as in a conventional example shown in FIG. 3B, the following situation is provided: when the gas turbine engine 11 is being rotated at a predetermined rotational speed and the motor/generator 12 is conducting a usual power generation, the voltage of the DC lines 31, 31 (namely, the voltage of the smoothing capacitor 15) is maintained at 280 V which is the standard voltage, but when the discharging relay 34 is turned on when the rotational speed of the gas turbine engine 11 is reduced down to zero to turn off the main contactor 17, the electric charge of the smoothing capacitor 15 is consumed by the discharging resistor 33, whereby the voltage is reduced to zero.

However, if the discharging resistor 33 is connected through the discharging relay 34 to the smoothing capacitor 15, and the discharging relay 34 is turned on during stoppage of the power generating system to conduct the discharging by the discharging resistor 33, there is a problem that the number of parts is increased by the discharging resistor 33 and the discharging relay 34.

Therefore, in the present embodiment, after the main contactor 17 is turned off and disconnected from the AC power source 22, the DC current from the smoothing capacitor 15 is converted into the AC current in the inverter 14 by the command from the control means 28, and consumed in the LC filter 16, thereby discharging the smoothing capacitor 15 without need for the discharging resistor 33 and the discharging relay 34. Alternatively, the DC current from the smoothing capacitor 15 is converted into the AC current in the converter 13 functioning as the inverter by the command from the control means 28, and consumed in the motor/generator 12, thereby discharging the smoothing capacitor 15 without need for the discharging resistor 33 and the discharging relay 34. In the latter case, it is desirable that the duty for operating the switching elements 26 of the converter 13 is set at a smaller value such that the motor/generator 12 is rotated at an extremely low speed, or is not rotated.

Figure 3C:
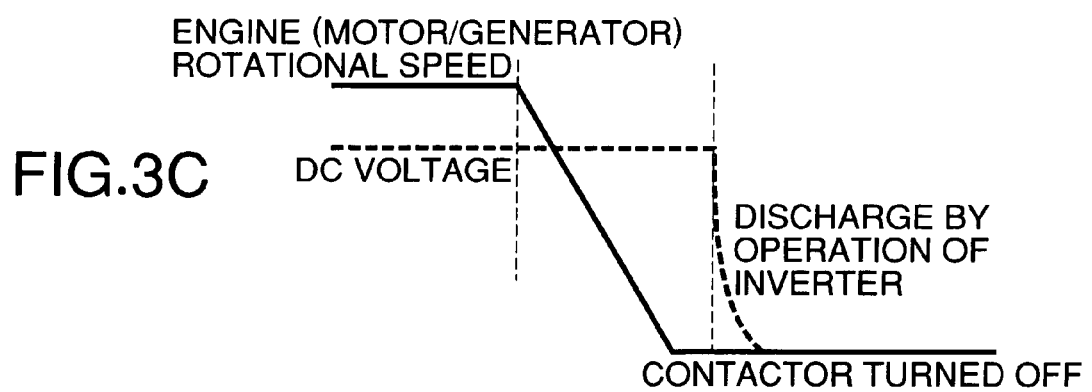

As a result, when the rotational speed of the gas turbine engine 11 is reduced down to zero to turn off the main contactor 17, as shown in FIG. 3C, the electric charge of the smoothing capacitor 15 is simultaneously consumed in the LC filter 16 or the motor/generator 12, resulting in decrease in voltage to zero. In this way, according to the present embodiment, the smoothing capacitor 15 can be completely discharged without need for special discharging circuits such as the discharging resistor 33 and the discharging relay 34.

Figure 3D:
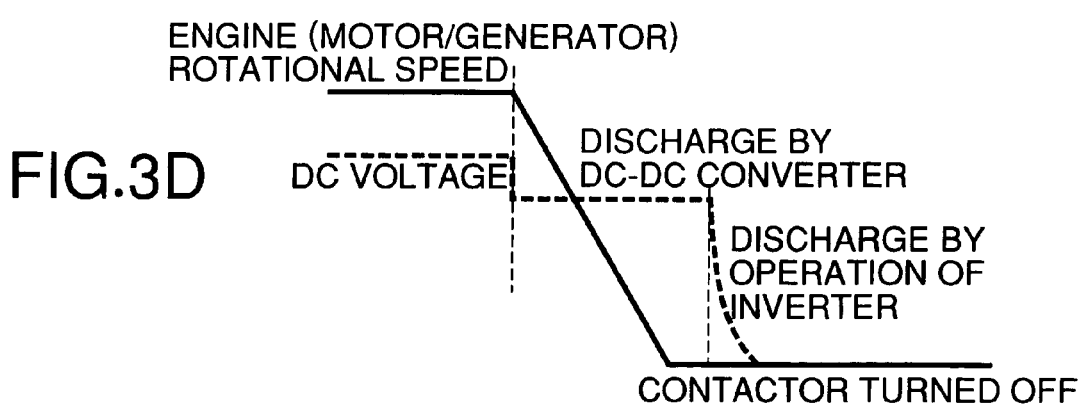
Figure 4:
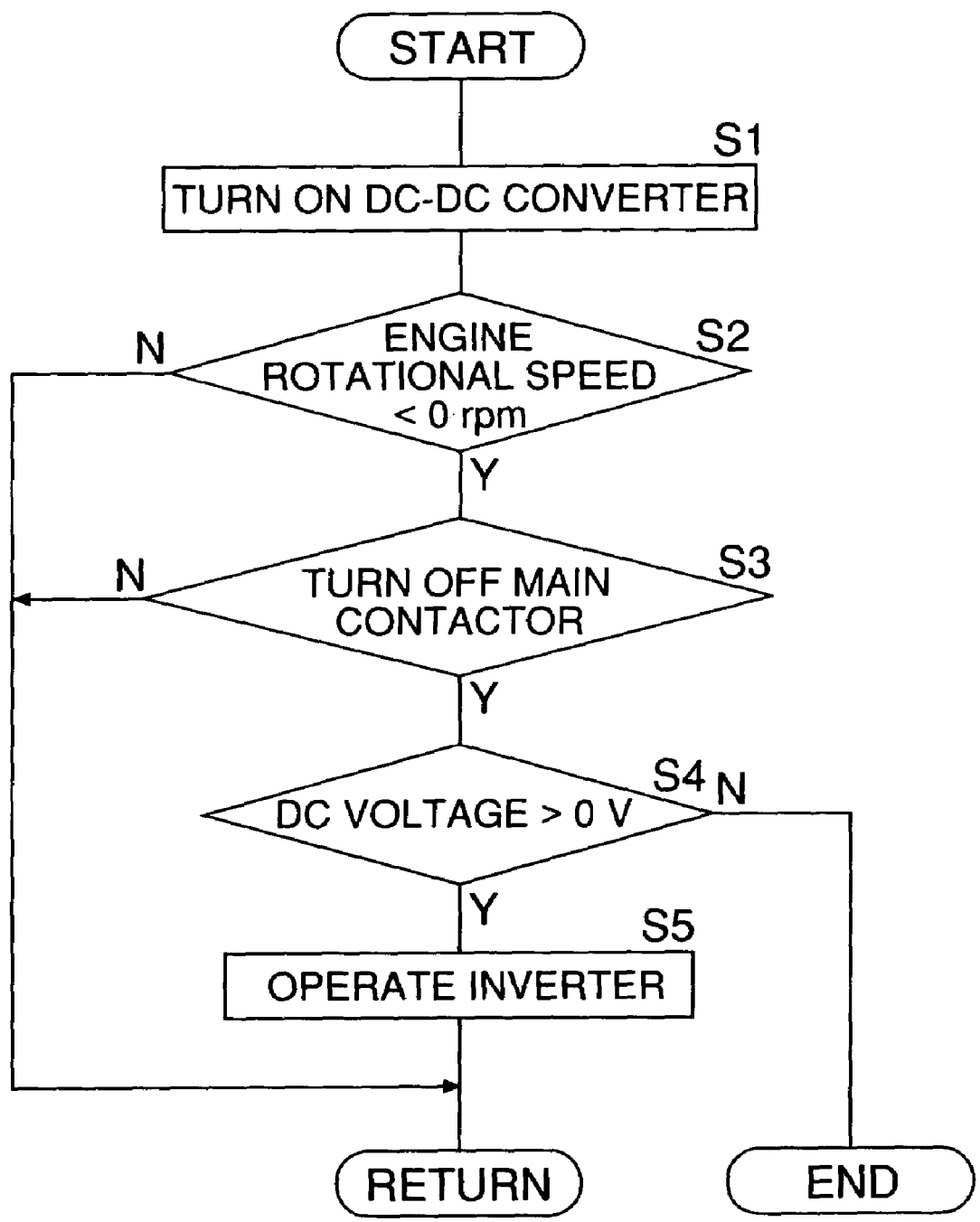
FIG. 4 is a flow chart showing a procedure during charging of the smoothing capacitor.

Another example of the present embodiment is shown in a flow chart of FIG. 4 and in a time chart of FIG. 3D.

First, at Step S1, the DC-DC converter 20 is operated when the rotational speed of the gas turbine engine 11 starts to decrease, and the voltage of the smoothing capacitor 15 is reduced and used for charging the battery 37 for the auxiliary or for driving the auxiliary 36, thereby discharging the smoothing capacitor 15. However, when the voltage of the smoothing capacitor 15 is reduced to a lowest voltage for operation of the DC-DC converter 20, the smoothing capacitor 15 cannot be further discharged. Therefore, when the rotational speed of the gas turbine engine 11 is reduced down to a predetermined value (0 rpm in the embodiment) at Step S2, the main contactor 17 is turned off at Step S3, and while the voltage of the smoothing capacitor 15 detected by the voltage detecting means 35 exceeds a predetermined value (0 V in the embodiment) at Step S4, the inverter 14 is operated at Step S5, whereby the remaining electric charge of the smoothing capacitor 15 is consumed in the LC filter 16. When the voltage of the smoothing capacitor 15 is reduced to 0 V which is a predetermined voltage at Step S4, it is determined that the discharging of the smoothing capacitor 15 has been completed, and the operation of the inverter 14 is stopped.

In place of the operation of the inverter 14 at Step S5 to consume the remaining electric charge of the smoothing capacitor 15 in the LC filter 16, the converter 13 may be operated to consume the remaining electric charge of the smoothing capacitor 15 in the motor/generator.

In this way, according to the present embodiment, it is possible not only to eliminate the need for the discharging resistor 33 and the discharging relay 34 to reduce the number of parts, but also to save the power which would be wastefully consumed in the case where the discharging resistor 33 is constantly connected to the smoothing capacitor 15. Moreover, even if the voltage of the smoothing capacitor 15 is reduced, and as a result the DC-DC converter 20 is brought into an inoperable state, the smoothing capacitor 15 can be completely discharged, while utilizing the electric charge of the smoothing capacitor 15 to the maximum by reducing the electric charge in the DC-DC converter 20 to charge the battery 37 for the auxiliary.

Although the embodiment of the present invention has been described in detail, the present invention is not limited to the above-described embodiment, and various modifications in design may be made without departing from the subject matter of the invention defined in the claims.

What is claimed is:

1. A power generating system using a stationary gas turbine engine as a power source, the power generating system including a pre-charging system for a smoothing capacitor, the pre-charging system comprising:
   an AC power source for driving of the power generating system at a time of starting operation of the power generating system;
   a switching circuit connected to the AC power source;
   a smoothing capacitor connected in parallel to the switching circuit;
   a main contactor disposed between the AC power source and the switching circuit;
   an LC filter disposed between the main contactor and the switching circuit;
   a pre-charging contactor connected between the AC power source and the switching circuit in parallel to the main contactor;
   a voltage detecting means for detecting a voltage of the smoothing capacitor; and
   a control means for controlling charging of the smoothing capacitor, wherein the pre-charging system is configured to charge the smoothing capacitor to have a predetermined voltage, and in order for the smoothing capacitor to be charged to have said predetermined voltage before starting operation of the power generating system, the control means turns on the pre-charging contactor to charge the smoothing capacitor through the switching circuit by the AC power source; and, when the voltage of the smoothing capacitor detected by the voltage detecting means exceeds a predetermined intermediate value, brings the switching circuit into a boosting operation with a command from the control means to further charge the smoothing capacitor.

2. The system of claim 1, wherein the pre-charging system is configured to completely charge the smoothing capacitor without an LC relay.

3. The system of claim 1, wherein the gas turbine engine comprises a motor/generator that is configured to generate a three-phase AC current when driven by the gas turbine engine.

4. The system of claim 3, wherein the three-phase AC current is configured to be of the same frequency as a commercial power source.

5. The system of claim 1, wherein, when the operation of the power generating system is to be stopped, it is arranged that after the main contactor is turned off and disconnected from the AC power source, a DC current from the smoothing capacitor is converted into an AC current in an inverter by a command from the control means, and consumed in the LC filter.

6. The system of claim 1, further comprising a motor/generator, wherein, when the operation of the power generating system is to be stopped, it is arranged that after the main contactor is turned off and disconnected from the AC power source, a DC current from the smoothing capacitor is converted into an AC current in a converter functioning as an inverter by a command from the control means, and consumed in the motor/generator.

* * * * *